June 17, 1930. H. J. KICHERER ET AL 1,764,840
AUTOMOBILE FRAME STRAIGHTENER
Filed June 20, 1928 2 Sheets-Sheet 2

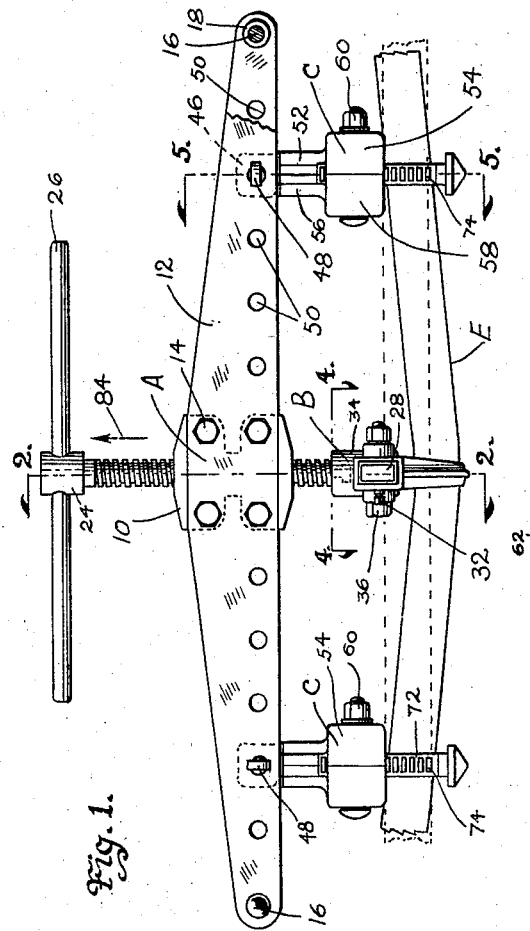
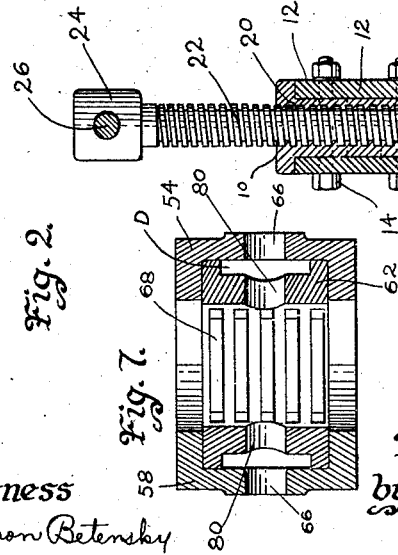
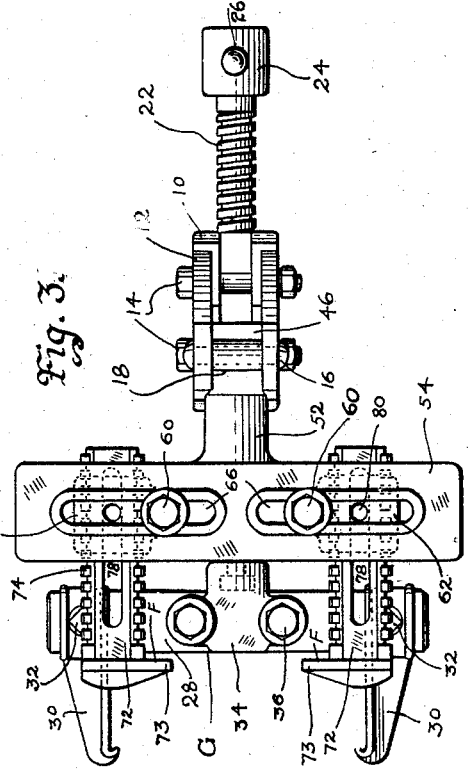
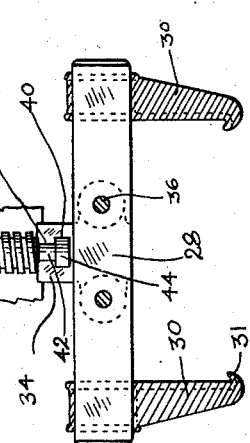
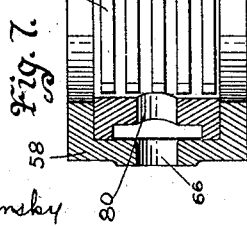

Witness
Solomon Betensky

Inventors
Harry J. Kicherer & R. B. Niles
by Bair, Freeman & Sinclair
Attorneys

Patented June 17, 1930

1,764,840

UNITED STATES PATENT OFFICE

HARRY J. KICHERER AND R. B. NILES, OF MINNEAPOLIS, MINNESOTA, ASSIGNORS TO MARQUETTE MANUFACTURING COMPANY, OF ST. PAUL, MINNESOTA

AUTOMOBILE FRAME STRAIGHTENER

Application filed June 20, 1928. Serial No. 286,823.

The object of our invention is to provide a straightening device especially adapted for the frames of automobiles, the device itself being of simple, durable and comparatively inexpensive construction.

A further object is to provide a device of this character so constructed that it is light and can thereby be easily handled for the purpose of straightening automobile frames and yet is strong enough to withstand the strain resulting when straightening frames of different kinds.

Still a further object is to provide a straightening device in which pressure bars and hook arms are provided which are readily adjustable to frames of various sizes and for bends of various lengths occurring in the automobile frame.

Still a further object is to provide the pressure bars and hook arms arranged to be actuated in opposite directions whereby both inwardly and outwardly bent parts of the frame may be brought back into the original shape.

More particularly it is our object to provide a device of the character herein disclosed consisting of a main frame of bar like construction having a central engaging head mounted for adjustment toward or away from the bar and having end engaging heads adapted to be adjusted to positions at various distances from the central engaging head.

Another object is to provide hook arms on each of the pressure bars which are slidably mounted longitudinally on the pressure bars whereby they may be adjusted for automobile frames of different widths and to further provide novel means for adjusting the hook arms on the end engaging heads to extend different distances from the pressure bars included in the end engaging heads.

In the construction of a frame straightener as we have herein disclosed, we have endeavored to design a device which will efficiently remove twists and bends from automobile frames without the necessity of heating the frame before bending it back into shape.

It has been our further object to design the straightener in such compact form that it is unnecessary to remove either the motor or the body of the automobile during straightening operation on the frame.

With these and other objects in view our invention consists in the construction, arrangement and combination of the various parts of our device, whereby the objects contemplated are attained, as hereinafter more fully set forth, pointed out in our claims, and illustrated in the accompanying drawings, in which:—

Figure 1 is a plan view of our frame straightener illustrating it in use on a section of an automobile frame.

Figure 2 is an enlarged sectional view on the line 2—2 of Figure 1.

Figure 3 is an end view of the entire device illustrated in Figure 1, showing it turned a quarter turn and in the position it assumes when being connected to an automobile frame for straightening the same.

Figure 7 is a sectional view on the line 7—7 of Figure 5, omitting the hook arm.

Figure 4:
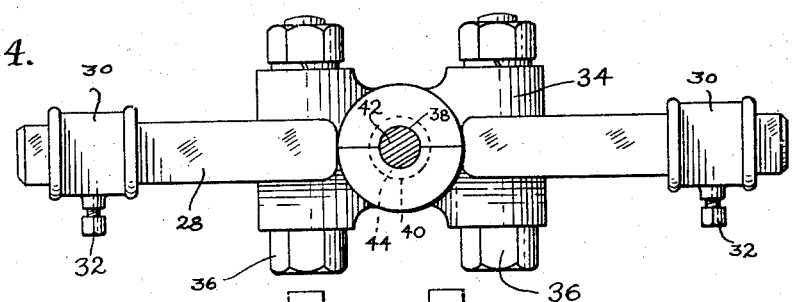
Figure 4 is an enlarged sectional view on the line 4—4 of Figure 1.
Figure 5:
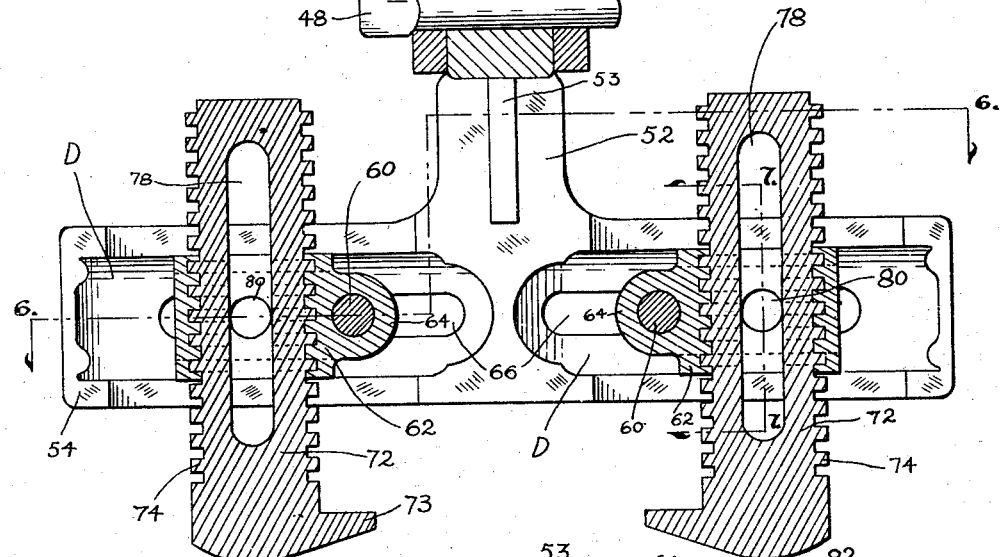
Figure 5 is an enlarged sectional view on the line 5—5 of Figure 1.

On the accompanying drawings, we have used the reference character A to indicate generally a main frame. A central engaging head B and end engaging heads C are mounted on the frame A.

The frame A consists of a center casting 10 having a pair of side bars 12 secured thereto by means of bolts 14. The bars 12 are arranged in parallel relation to each other. The outer ends of the bars 12 are held assembled together by bolts or rivets 16. Spacer sleeves 18 are positioned on the rivets 16 between the bars 12.

The central casting 10 is provided with an internally screw threaded bore 20. A threaded rod 22 extends through the bore 20 and swively supports the central engaging head B upon its lower end. The upper end of the rod 22 is provided with a head 24 and an operating handle 26.

The central engaging head B consists of a pressure bar 28 having hook arms 30 slidably mounted thereon. The hook arms 30 may be maintained in any of their adjusted positions relative to the pressure bar 28 by means of set screws 32. The pressure bar 28 is connected to the rod 22 by means of a member 34 formed in two halves as clearly illustrated in Figure 4 of the drawings. The member 34 is secured to the pressure bar 28 by means of bolts 36 which in addition to serving the purpose of connecting the pressure bar 28 and the member 34, serve to hold the two halves of the member together.

A bore 38 is formed in the member 34 and terminates in an enlarged socket 40. The threaded rod 22 is provided with a reduced portion 42 to fit the bore 38 and has a head 44 to fit the socket 40. From the construction of the parts just described, it will be obvious that when the two halves of the member 34 are assembled together with the portions 42 and 44 of the rod 22 in position, the pressure bar 28 is swivelly mounted relative to the rod 22.

Each end engaging member C comprises a head 46 mounted between the bars 12. The head 46 is provided with an opening through which a pin 48 extends. The pin 48 may extend selectively through openings 50 formed in the bars 12 as clearly illustrated in Figure 1 of the drawings. Thus the end engaging member C may be adjusted toward or away from the central engaging member B as desired.

The head 46 of each end engaging member C is provided with an extension 52 terminating in a box like transverse portion 54. An arm 56 similar to the extension 52 and having a box like transverse portion 58 similar to the portion 54, is bolted to the portion 54 by bolts 60. To insure proper alignment of the portions 54 and 58, we provide a tongue and groove connection indicated at 53 and 57 in Figure 6. When the two portions 54 and 58 are together they form a channel D closed on all four sides and extending longitudinally relative to the members 54 and 58 as clearly illustrated in Figure 7 of the drawings. The members 54 and 58 constitute a pressure bar for the same purpose for which the pressure bar 28 is provided.

Slidably mounted in the channels D are hook arm supporting members 62. The members 62 are provided with bosses 64 adapted to receive the bolts 60 and the bolts 60 extend through slots 66 formed in the two portions 54 and 58 of the pressure bar. From the construction of the parts just described, it will be obvious that the bolts 60 which hold the portions 54 and 58 together, may be loosened whereupon the members 62 may be slid toward or away from each other as desired, whereupon the bolts 60 may be tightened for preventing further sliding movement of the members 62.

Each member 62 is internally provided with annular grooves 68. The grooves 68 are spaced from each other at regular intervals and are cut away as indicated at 70 for a purpose hereinafter to be described. Hook arms 72 are mounted in the members 62 and are provided with annular portions 74 which extend only part way around their circumference as clearly shown in Figure 6.

Figure 6:
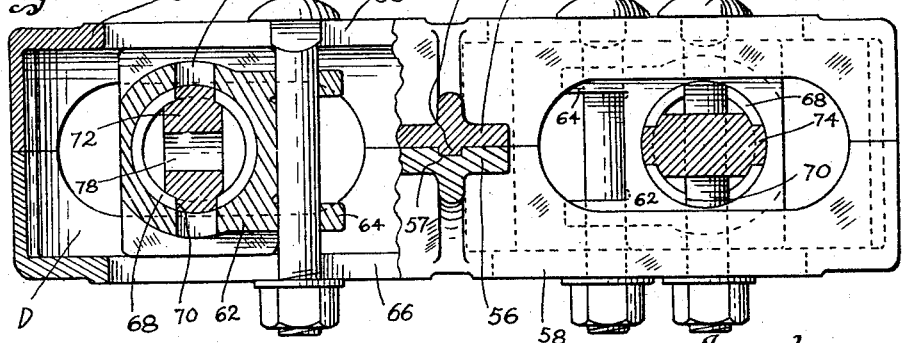
Figure 6 is a sectional view on the line 6—6 of Figure 5.

The projections 74, when the hook arm 72 is rotated to the position shown in the left half of Figure 6, may slide through the member 62 to any position with respect to the member 62. It can then be rotated in either direction to position shown in the right half of Figure 6 whereby the projections 74 enter the grooves 68 and the hook arm 72 is thereafter prevented from longitudinal movement.

In the manner just described, the hook arm 72 may be adjusted as desired independent of the adjustment of the member 62 relative to the portions 54 and 58 of the end engaging members C.

The hook arms 72 are provided with slots 78 and the members 62 are provided with openings 80 through which a bolt 82 may extend as illustrated in Figure 6. By using the bolt 82, an additional anchoring means over the bolt 60 is provided and the bolt 82 also prevents the hook arm 72 from turning and possibly turning to such a position that it can slide longitudinally relative to the member 62. However, we have found that the bolt 82 needs to be used only on extra-heavy duty work.

*Practical operation*

As illustrated in Figure 1 of the drawings, a bent automobile frame E may be straightened to the position illustrated in dotted lines by positioning our straightening device as illustrated with the engaging heads C pressing against the outside of the frame and the hook arms 30 having their hook portions 31 engaging the frame E. The operating handle 26 may then be manipulated by the operator for rotating the screw 22 to move in the direction of the arrow 84 whereby the frame E will be brought to a straightened position as shown in dotted lines.

The frame, of course, would have to be bent a little past its straight position so that when it is sprung back after the pressure of the straightening device is released, it will then assume a straight position. The amount of over-operation can be judged by anyone skilled in straightening a frame by our device.

When it is desired to bend the frame E in an opposite direction as for instance, when the central part is bowed outwardly instead of inwardly, the hook portions 73 of the end engaging heads C are caused to engage the inside of the frame and the pressure bar 28 engages the outside of the frame as indicated at F and G in Figure 3. The screw 22 is then rotated in a direction for movement opposite to the arrow 84 whereupon the frame may be straightened.

Our device is especially designed for automobile frames and may be used for either straightening them or removing twists from them, a great deal of the work being done while the body and motor remain upon the automobile frame. Various combinations may be worked out with the parts of our device for handling straightening jobs of different characters.

Some changes may be made in the construction and arrangement of the parts of our device, without departing from the real spirit and purpose of our invention, and it is our intention to cover by our claims, any modified forms of structure or use of mechanical equivalents, which may be reasonably included within their scope.

We claim as our invention:

1. A device of the character disclosed comprising a main frame, an engaging head longitudinally adjustable with respect thereto and including a pressure bar, a pair of hook arm supports longitudinally adjustable on said pressure bar, hook arms slidably mounted with respect to said supports and bolt means for clamping said supports and hook arms in stationary position relative to said pressure bar.

2. A device of the character disclosed comprising a main frame, an engaging head thereon and including a pressure bar, a pair of hook arm supports longitudinally adjustable on said pressure bar, hook arms slidably mounted with respect to said supports and common bolt means for clamping said supports and hook arms in stationary position relative to said pressure bar.

3. A device of the character disclosed comprising a main frame, an engaging head thereon and including a pressure bar, a pair of hook arm supports longitudinally adjustable on said pressure bar, hook arms slidably mounted with respect to said supports, said supports being internally provided with spaced annular grooves and said hook arms being externally provided with spaced annular projections to coact with said grooves.

4. A device of the character disclosed comprising a main frame, an engaging head thereon and including a pressure bar, a pair of hook arm supports longtiudinally adjustable on said pressure bar, hook arms slidably mounted with respect to said supports, said supports being internally provided with spaced annular grooves and said hook arms being externally provided with spaced annular projections to coact with said grooves, said grooves and projections being partially cutaway to permit longitudinal sliding of the hook arms relative to the supports when the hook arms are rotated to one position and prevent such sliding when the hook arms are rotated to another position.

5. In a device of the class described, a main frame, an engaging head thereon including a pressure bar, a hook arm supporting member longitudinally adjustable relative to said pressure bar, said member having a bore therein, a hook arm in said bore, annular groove and rib means in said member and on said arm whereby the arm may be maintained in any adjusted position relative to the member and cutaway portions in said grooves and projections to allow sliding movement of the arm relative to the member.

6. In a straightening device, a center member, a pair of parallel bars secured thereto to form a main frame, a central engaging head including a rod screw threaded in said center member and a pressure bar swivelly mounted on said rod, a pair of end engaging heads mounted between said parallel frame bars and including pressure bars having hook arm supporting members longitudinally adjustable on said pressure bars and hook arms rotatably and slidably mounted in said supporting members but prevented from sliding movement therein when rotated to a predetermined position.

7. An engaging head comprising a pressure bar, a hook arm supporting member and a hook arm rotatably and slidably mounted in said supporting member but prevented from sliding movement therein when rotated to a predetermined position.

8. In a straightening device, a main frame member, end engaging heads thereon and a central engaging head thereon comprising a pressure bar, a pair of hook arms longitudinally slidable thereon, a connecting member formed of two parts bolted to opposite sides of said pressure bar, a socket in said two parts and a screw having a head swivelly mounted in said socket and screw threadedly mounted with respect to said main frame.

HARRY J. KICHERER.
R. B. NILES.